United States Patent [19]

Zornig et al.

[11] Patent Number: 5,742,587
[45] Date of Patent: Apr. 21, 1998

[54] LOAD BALANCING PORT SWITCHING HUB

[75] Inventors: John G. Zornig, Boston; Tavit K. Ohanian, Waltham; George A. Klarakis, Franklin, all of Mass.

[73] Assignee: LANart Corporation, Needham, Mass.

[21] Appl. No.: 808,083

[22] Filed: Feb. 28, 1997

[51] Int. Cl.⁶ .............................. H04L 12/26; H04L 12/56
[52] U.S. Cl. .................... 370/235; 370/252; 370/401; 370/465; 395/200.64; 395/200.8
[58] Field of Search .................................. 370/229, 230, 370/231, 232, 235, 236, 252, 253, 389, 400, 401, 407, 408, 425, 465, 468; 395/200.53, 200.54, 200.55, 200.56, 200.62, 200.64, 200.65, 200.8

[56] References Cited

U.S. PATENT DOCUMENTS

| | | | |
|---|---|---|---|
| 4,460,994 | 7/1984 | Scanlon et al. | 370/452 |
| 4,616,359 | 10/1986 | Fontenot | 370/230 |
| 4,771,424 | 9/1988 | Suzuki et al. | 370/400 |
| 5,048,013 | 9/1991 | Eng et al. | 370/229 |
| 5,103,446 | 4/1992 | Fischer | 370/236 |
| 5,239,653 | 8/1993 | Cubero-Castan et al. | 395/200.72 |
| 5,313,454 | 5/1994 | Bustini et al. | 370/231 |
| 5,345,447 | 9/1994 | Noel | 370/362 |
| 5,377,327 | 12/1994 | Jain et al. | 395/200.65 |
| 5,396,495 | 3/1995 | Moorwood et al. | 370/408 |
| 5,436,617 | 7/1995 | Adams et al. | 370/254 |
| 5,446,735 | 8/1995 | Tobagi et al. | 370/445 |
| 5,467,345 | 11/1995 | Cutler, Jr. et al. | 370/229 |
| 5,467,347 | 11/1995 | Petersen | 370/230 |
| 5,469,438 | 11/1995 | Baumert et al. | 370/432 |
| 5,483,533 | 1/1996 | Kuba | 370/532 |
| 5,491,687 | 2/1996 | Christensen et al. | 370/253 |
| 5,493,610 | 2/1996 | Suzuki et al. | 379/100.17 |
| 5,495,426 | 2/1996 | Waclawsky et al. | 395/200.56 |
| 5,648,959 | 7/1997 | Iiyadis et al. | 370/445 |

*Primary Examiner*—Alpus H. Hsu
*Attorney, Agent, or Firm*—Lappin & Kusmer LLP

[57] ABSTRACT

A port switching hub consists of a number of local area network ports, a number of internal channels to which these ports may be connected from time to time under program control, and circuitry suitable for causing each channel to function as a local area network repeater. The ports have a variety of control and measurement functions associated with them. An instrumentation, a programmable controller or embedded computer program, for example, estimates the traffic load on each channel based on information available from the port controllers. The control program further predicts the effect of reassigning the ports to different channels based on available data, internal models of network behavior, and other constraints such as address assignment, and changes the port assignment so as to achieve a goal, such as balancing of traffic load or assignment. The reassignment of ports may occur periodically, or in response to an event, and may or may not be forced to occur during a period of channel inactivity.

17 Claims, 7 Drawing Sheets

LOAD BALANCING PORT SWITCHING HUB

NOTICE OF COPYRIGHT

Copyright, 1995, 1996, LANart Corporation. A portion of the disclosure of this patent document contains material which is subject to copyright protection. The copyright owner has no objection to facsimile reproduction by anyone of the patent document or the patent disclosure, as it appears in the U.S. Patent and Trademark Office patent file or records, but otherwise reserves all copyright rights whatsoever.

TECHNICAL FIELD

The present invention relates to local area networks (LANs) and in particular to interconnection hubs capable of switching ports among multiple internal repeater channels.

BACKGROUND

A Local Area Network (LAN) is a type of data network that is optimized for connecting network terminals and resources that are distributed over a moderate size geographic area, such as a single office building, a warehouse or a campus. There are many types of LAN configurations, for example, star, bus and ring; each type may be configured in accordance with an industry developed standard specification. One of the most common LAN specifications is IEEE 802.3, commonly known as Ethernet. The Ethernet specification generally defines how a plurality of data terminals are interconnected to a common bus for the transfer of data.

One of the primary functions of a LAN is to provide users, via workstations, access to network resources such as File Servers, Database Servers and print queues. One of the benefits of a LAN is that it enables an organization to share resources efficiently in a controlled manner. In addition to Workstations, Servers and printers, other network devices such as repeaters, hubs, bridges, routers and gateways can be used to further define the physical and logical structure of the network.

A LAN repeater is a device intended to permit the connection of two or more network devices together to form a group of devices that share access to a single network segment. The repeater includes a number of bidirectional ports which accept data input and retransmit that data to all the other ports. Any such port can act as an input port or an output port to permit data flow in any direction between two ports in the repeater. Repeaters are primarily used to extend the length, or diameter, of local area networks.

A local area network hub, as used herein, is a repeater having a number of ports which permit a number of network devices to be connected to a common network segment. The ports allow various ones of the different types of network devices to be connected to the network segment. Network devices include, for example, a network workstation such as a personal computer (PC), a network router or bridge, or another network hub or repeater. Network hubs are used primarily as management devices in the construction of a local area network and to increase the number of stations that may be connected to the network.

A port switching hub is a device that includes of a number ports, a number of internal repeater channels having circuitry which enables each repeater channel to function as a LAN repeater, and switching circuitry which permits each of the ports to be selectively connected to any of the internal repeater channels. Port switching hubs are used to provide a flexible LAN configuration which is capable of connecting network devices to different physical network segments as necessary. The internal repeater channels provide internal data pathways for connecting each port to a network segment. Each of the ports can be selectively connected to any of the internal repeater channels. A port switching hub has a programmable controller, typically based on a general purpose central processing unit (CPU), that controls the operation of the hub. The internal repeater channels of the hub can support a specific physical layer technology, such as Ethernet or Token Ring, or can support a different but compatible technology.

In prior art port switching hubs, the ports can provide attachment circuitry suitable for providing a particular type of LAN connection (e.g. 10Base-T Ethernet). In addition, port switching hubs can have a variety of control and measurement subsystems associated with them, such as counters for monitoring network traffic and errors, address detection registers, security mechanisms and administrative controllers functions. Such counters may record traffic data, such as the total number of frames received, the total number of bytes received, and various kinds of errors detected. The counters can also count the number of frames having certain characteristics, for example, the number of frames that are shorter than a predetermined threshold length, or catalog the number of frames in a certain size range. The data from these counters is available to the programmable controller and can be reported to the network administrator for network management purposes.

Each repeater channel, with the ports attached to it at a given time, functions as a repeater which retransmits data received by it to all the other ports connected to that repeater channel while performing retiming and other corrective functions. All repeaters within the hub can be controlled by the programmable controller, which can in turn communicate with external systems via separate connections or through one or more of the network ports.

In a typical prior art system, one or more of the repeater channels of a port switching hub are connected to a bridge, router or some other frame switching device in order to provide further connectivity among the channels and to other network systems or resources. Each repeater channel can connect one or more network devices to the LAN in order to transfer the network traffic load of each network device to the LAN. In many cases it is desirable to balance the traffic loads transmitted over the connection between the port switching hub and the bridge or router. It is also desirable to balance the traffic load across several repeater channels. In other cases, it can be desirable to manipulate the ports so as to keep traffic of a particular type or having specific characteristics isolated to one or more specific repeater channels or network segments or automatically assign ports that are connected to network devices having specific network addresses or other data to particular channels or segments.

The performance of the network depends variously on the characteristics of the communications protocols used and the structure of the network itself. Thus, a variety of definitions of load balancing and other goals may be appropriate. However, in prior art port switching hubs, manipulation of the ports can only be performed manually, by command from remote systems based on predetermined assignments, either by human operators or based upon a manually predefined schedule.

Accordingly, it is an object of this invention to provide a port switching hub in which the network traffic load can be more equally distributed among the internal repeater channels of the port switching hub.

It is another object of this invention to provide a port switching hub which can dynamically adjust the network traffic load among the internal repeater channels.

It is yet another object of this invention to provide a port switching hub which can determine the network traffic load of the connection equivalent network devices connected to the hub and automatically distribute the connection equivalent network devices among two or more repeater channels in order to more equally distribute the network traffic load.

SUMMARY OF THE INVENTION

The present invention improves the operation of a port switching hub by automating the process of load management and distribution. In operation, a device embodying the invention performs a periodic reassignment of the network ports at the hub among internal repeater channels without requiring any external intervention. The invention is highly effective in balancing the load of network structures having flows typical of client/server environments in which the preponderance of traffic flows from assignable "downstream" ports to non-assignable or fixed "upstream" ports and vice versa. The invention provides better network utilization levels at lower delays.

According to one embodiment of the invention, the assignment of ports in a port switching hub is automated by implementing a novel method for the control of the port assignments based on data available within the hub, stored models of network behavior, and stored assignment rules and parameters. This enables a high degree of network optimization and discipline without the need for extensive interaction with network administrators and remote computer systems.

A system constructed in accordance with the invention includes a port switching hub and a programmable controller that can control the assignment of connections between the ports and the repeater channels. The programmable controller executes a stored program or other embodiment of an algorithm that measures the data flow through each port, uses that data to estimate the data flows attributable to each network device connected to a port of the port switching hub and which are generally not directly measurable by the port switch, determines channel assignments for those network ports that will improve the distribution of network traffic among the internal repeater channels, and actualizes the assignments by actuating the port switching function of the hub in order to connect the reassigned ports to the appropriate internal repeater channels of the port switch. This operation is performed dynamically so that changes in traffic over time are accommodated.

The invention provides for grouping of the channels according to equivalency classes herein referred to as Logical LANs (LLANs) such that port reassignments are limited to a single class or LLAN, and for selective removal of single ports from participation in the reassignment process. Each LLAN includes one or more repeater channels. Each of the ports of the port switch is either assigned to a LLAN or removed from the reassignment process. All of the ports that are assigned to the same LLAN make up an equivalency class in which all of the network devices connected to those ports have equivalent network connection requirements with regard to network resources.

The ports within each LLAN are further classified as either upstream ports or downstream ports. Upstream ports are connected to network devices that provide access to network resources, typically servers and print queues. Downstream ports are connected to network devices that require access to network resources, typically user workstations.

The network traffic flow through each port for a predefined period of time, referred to as the PortLoad, is monitored. For each repeater channel, the PortLoad for each downstream port is then adjusted to include the amount of upstream traffic that is attributable to that downstream port. The sum of the PortLoads for each repeater channel, referred to as the ChannelLoad, is calculated and for each LLAN, the average ChannelLoad is also calculated.

For each LLAN, each port associated with a channel having an above average ChannelLoad is evaluated to determine whether its PortLoad could be added to a destination channel with a below average PortLoad, without bringing the ChannelLoad above average. If a port is found which can be reassigned without bringing the ChannelLoad of the destination channel above average, the port is reassigned and the ChannelLoads are recalculated.

If no port is found, the evaluation is continued with the next port of the channel having an above average ChannelLoad. After all the channels having ChannelLoads above average have been considered and no ports are reassigned, the Average ChannelLoad is increased by an incremental amount and the ports of each LLAN are again evaluated to determine whether it is suitable for reassignment to a channel within the LLAN having a ChannelLoad below average. The process is terminated after the last port has been reassigned or if no ports can be reassigned. The process is repeated for all LLANs.

DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE INVENTION

The invention is directed to a method and an apparatus for adjusting the volume of network traffic traveling on repeater channels that are configured to be essentially equivalent network segments. In accordance with the invention, a port switching hub having a plurality of internal repeater channels determines a measure of the traffic volume or load attributed to the network device connected to each port of the port switching hub. This information approximating the traffic load attributed to each network device is utilized to dynamically adjust the port connection assignments with respect to the internal repeater channels in order to evenly distribute the network traffic among the repeater channels. The assignment process is automated by utilizing rules or algorithms which are based on estimates of anticipated port and channel activity and status.

Figure 1:
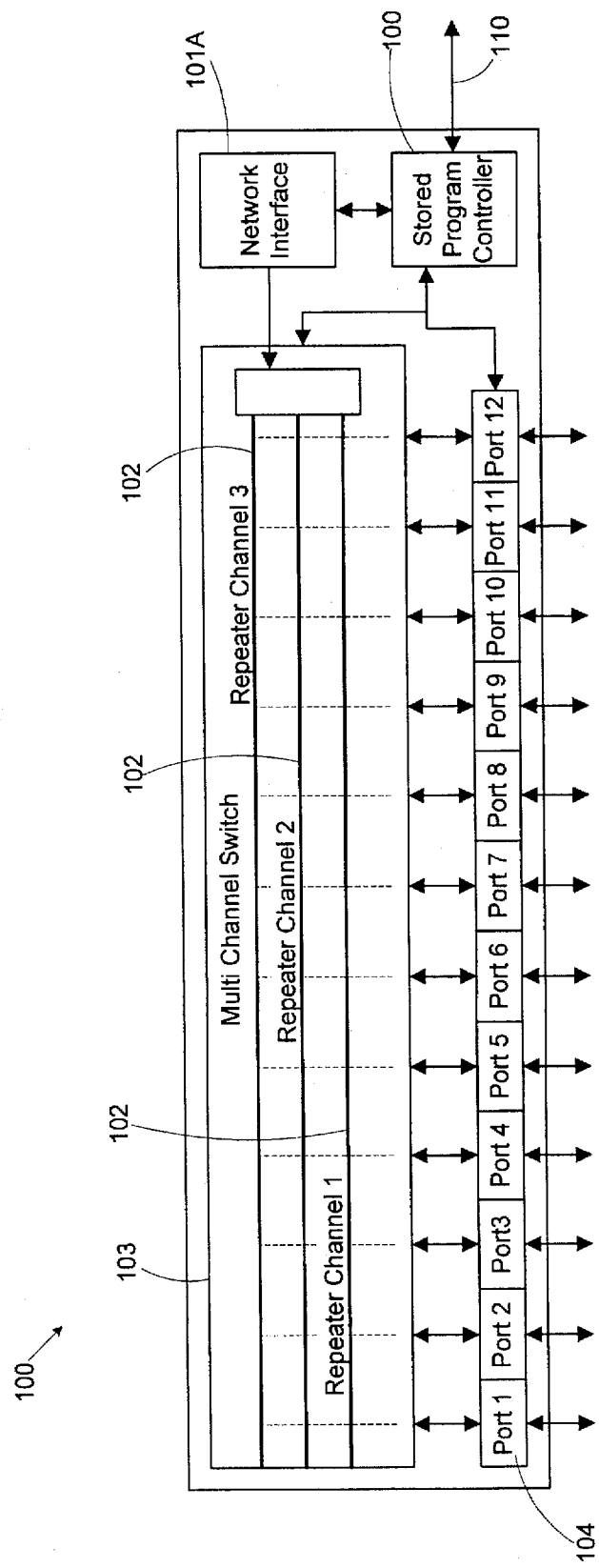
FIG. 1 is a diagrammatic view of a port switching hub in accordance with the present invention.

FIG. 1 shows a port switching hub 100 in accordance with one embodiment of the invention. The port switching hub 100 includes a stored program computer 101, a network interface 101A, a number of internal local area network (LAN) repeater channels collectively referred to as reference numeral 102 and a plurality of network port subsystems collectively referred to as reference numeral 104, together with a multichannel switching mechanism 103. Switch 103 is capable of connecting each port 104 to any of the channels 102. Each channel, together with the port subsystems connected to it at the time, functions as a complete LAN repeater. Thus any network traffic generated at any of the ports is distributed to all the other ports connected to the repeater channel.

The port subsystems 104 can include a variety of management mechanisms which can provide subsystems, typically counters for monitoring port traffic data and errors, subsystems for monitoring control interfaces for port status, and security subsystems. The port subsystems 104 and the switch 103 are connected to the programmable controller 101 or other device capable of communicating with them. Specifically, the programmable controller 101 is capable of reading and controlling the port subsystems 104 and the switch 103.

Figure 2:
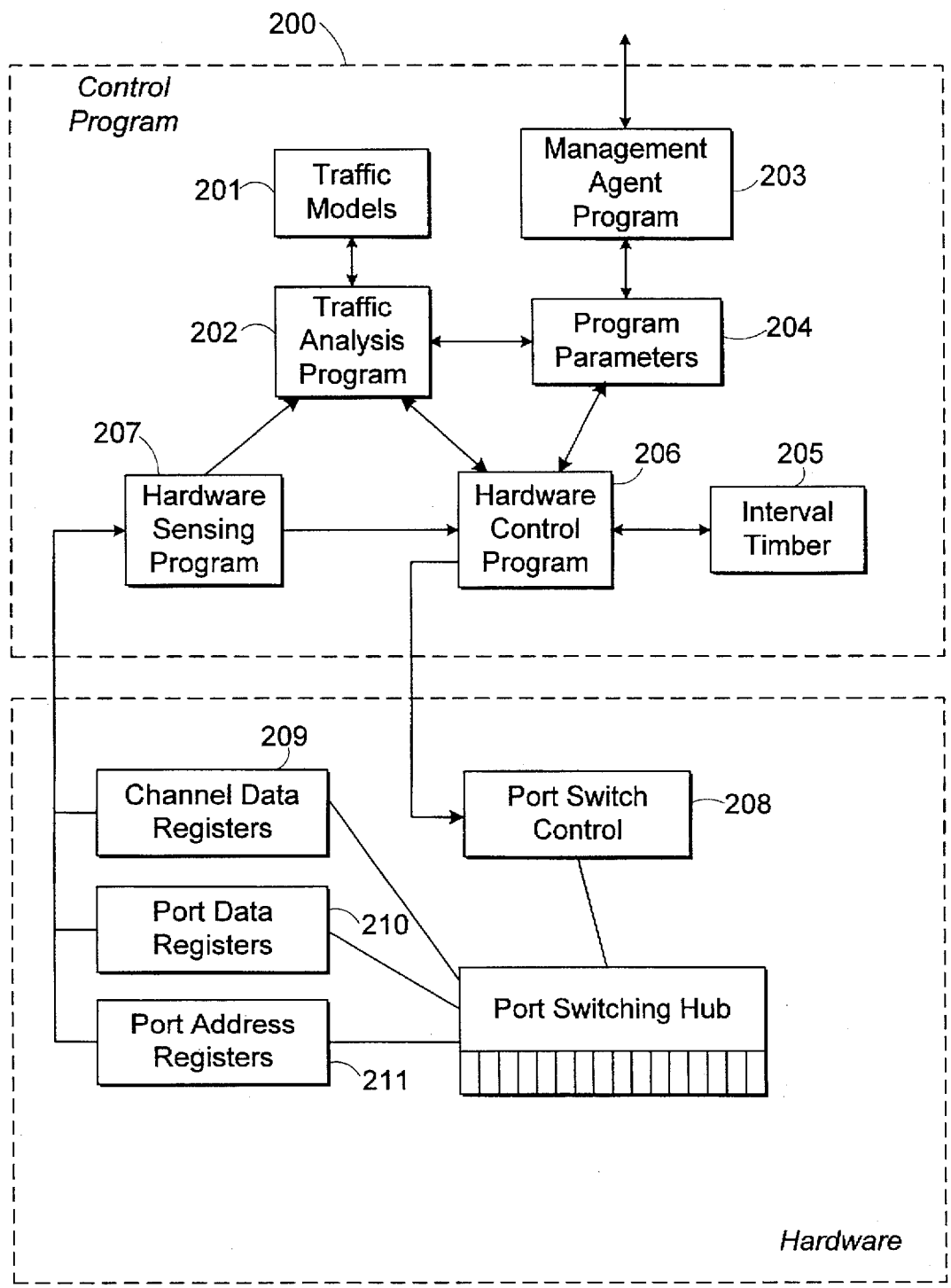
FIG. 2 is a block diagram of the hardware and software architecture of a load balancing port switching hub in accordance with one embodiment of the invention.

As shown in FIG. 2, the programmable controller 101 includes a control program 200 which implements a novel method for adjusting the network traffic load among a plurality of internal repeater channels 102 in port switching hub 100. In the illustrated embodiment, the control program 200 includes several separate program elements that perform various functions in accordance with the invention. More particularly, the program 200 includes traffic models 201, traffic analysis programs 202, management agent programs 203, program parameters 204, interval timer 205, hardware control program 206 and program sensing control 207. The hardware sensing program element 207 receives network traffic data from channel data registers 209, port data registers 210 and port address registers 211 associated with port subsystem 104. The registers 209, 210 and 211 are shown separately from hub 100 in FIG. 2. Those registers store information characteristic of network traffic, such as data flow through the network ports and the repeater channels. The traffic analysis program 202 utilizes traffic model data 201, predefined program parameter data 204 and the network traffic data from the hardware sensing program 207 to determine the PortLoads and the ChannelLoads as a function of the monitored network data flow information. The traffic analysis program 202 evaluates the PortLoads and ChannelLoads in order to determine whether a particular port should be reassigned and to which repeater channel. The hardware control program 206 interfaces with the port switch control system 208 to actuate the switch 103 and dynamically assign the ports 104 to their designated repeater channels 102. The hardware control program 206 is responsive to interval timer 205, which defines the length of time the port traffic data is monitored and when the port reassignment process is repeated.

The control program 200 also includes management agent programs 203 which provide an interface with a remote device (not shown). The remote device can allow a network administrator to input program parameters that influence various aspects of the load balancing process, as well as review the program parameters and the performance of the load balancing process. The remote device can be any device that facilitates the input and output of data. The device could be as simple as a keypad or joystick and display integrated with the hub or as sophisticated as a workstation accessing the port switching hub 100 over the network through a network port (or via an external port on the hub) using a Simple Network Management Protocol (SNMP) client software, a File Transfer Protocol (ftp) client or a Trivial File Transfer Protocol (tftp) client.

The control program 200, by issuing signals from the hardware control program element 206 to the port switch control 208, can effect the connection of any port to any repeater channel, or can schedule such an assignment to occur upon the occurrence of a specified event, such as when there is no signal present on either the port or the channel. The control program 200 can automatically assign ports to channels based on configuration data, data derived from the configuration data, or a predefined port assignment procedure in accordance with one embodiment of the invention.

In the preferred embodiment, the control program 200 is stored in a read only memory (ROM, not shown) associated with the programmable controller 101 of the port switching hub. Alternatively, the control program 200 may be received from an external device (not shown) and stored in memory (such as RAM, not shown) associated with the programmable controller 101 of the port switching hub 100. In an alternate embodiment, the control program 200 can be implemented in a device remote to the port switching hub such as a network server or a network management workstation (not shown). In this embodiment, the port switching hub 100 can transfer port data to and receive instructions from the remote device through the management agent program element 203. The remote device can be connected to the port switching hub 100 via a network connection using an SNMP, trip or ftp client or via an external port such as an RS-232 port on the port switching hub.

Figure 3:
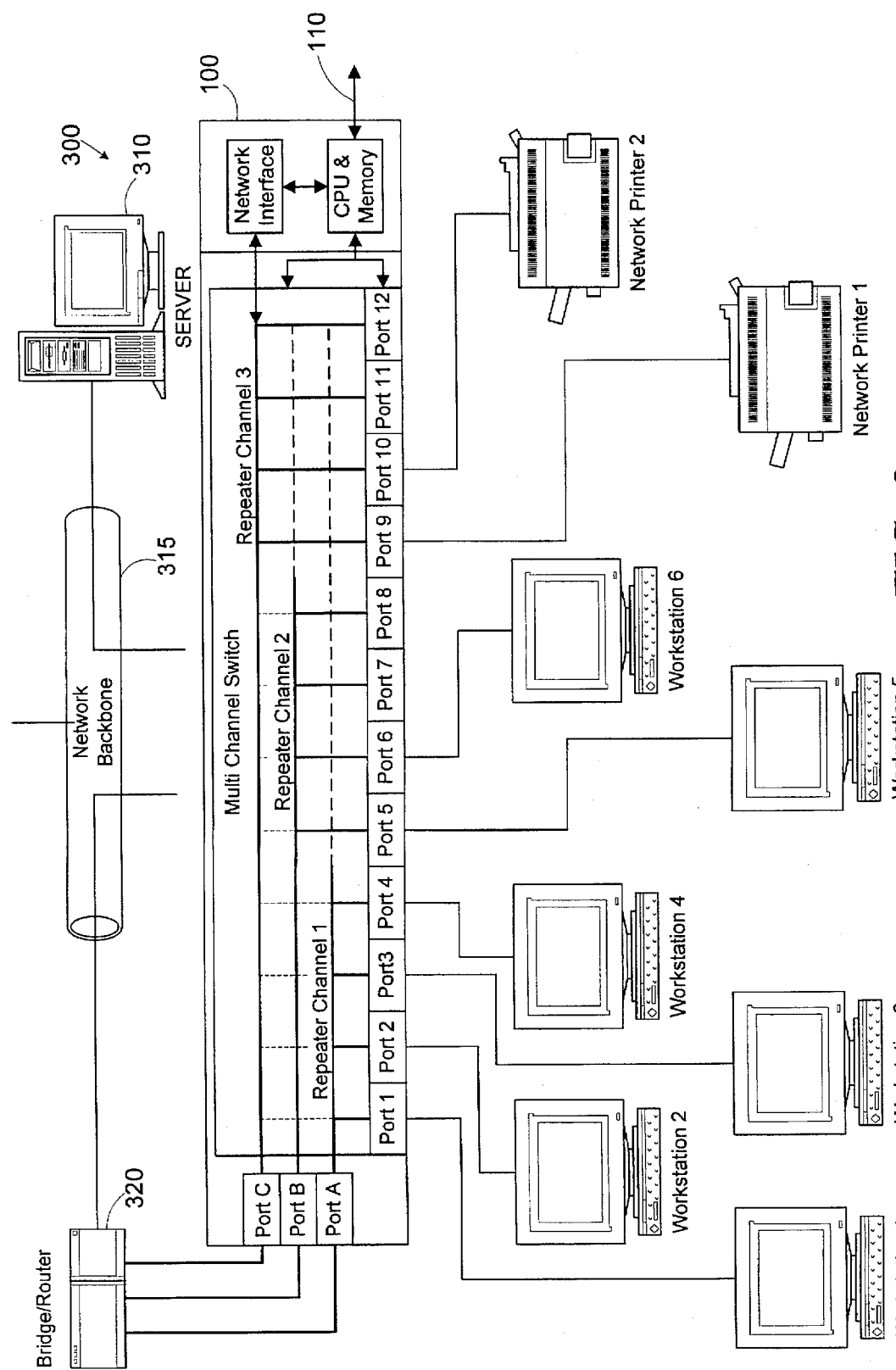
FIG. 3 is a block diagram of a local area network (LAN) embodying a load balancing port switching hub in accordance with one embodiment of the invention.

FIG. 3 shows an example of a local area network including a three channel load balancing port switching hub 100 in accordance with one embodiment of the invention. The port switching hub 100 has three channels, repeater channels 1–3, twelve assignable ports, Ports 1–12 and three fixed (non-assignable) ports, Ports A, B and C. Of the switchable ports, Ports 1–6 are connected to workstations 1–6 respectively and Ports 9 and 10 are connected to Network Printers 1 and 2, respectively. Fixed ports, Ports A, B and C connect repeater channels 1–3 respectively, to a network bridge 320 or other frame switching device. The bridge 320 is connected the network server 310 via the network backbone 305.

In the preferred embodiment, the load balancing process includes three basic procedures: 1) Configuration—which includes the designation of fundamental program parameters, such as LLANs and upstream and downstream ports; 2) Estimation—which includes monitoring the data flow through each of ports to determine the PortLoads and other parameters such as Adjusted PortLoads and ChannelLoads based upon rules and models; and 3) Port Assignment—which includes evaluating each LLAN to determine an optimum distribution of ports among two or more repeater channels.

Figure 4:
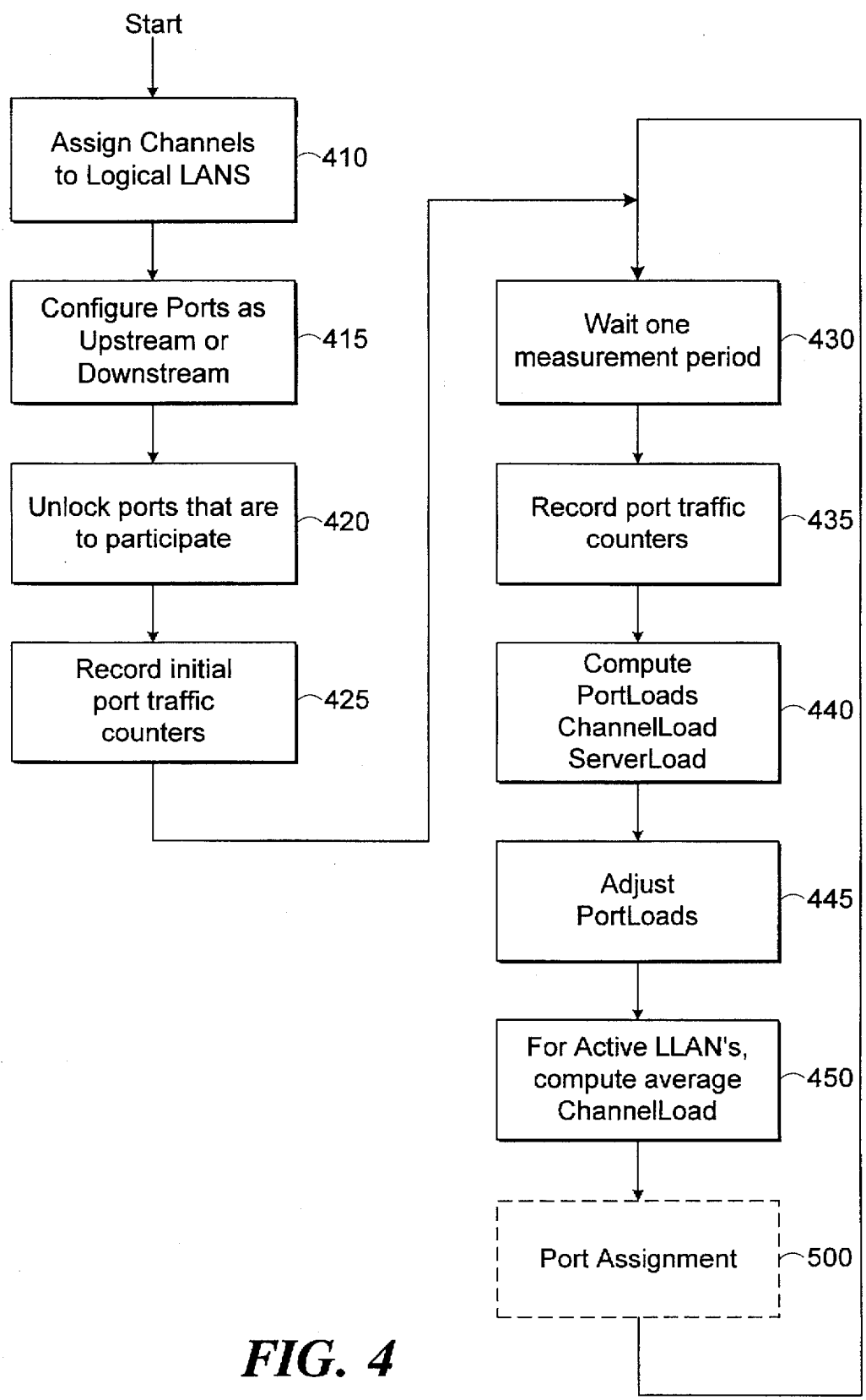
FIG. 4 is a flow chart showing a method of balancing the network traffic in a port switching hub in accordance with one embodiment of the invention.
Figure 5:
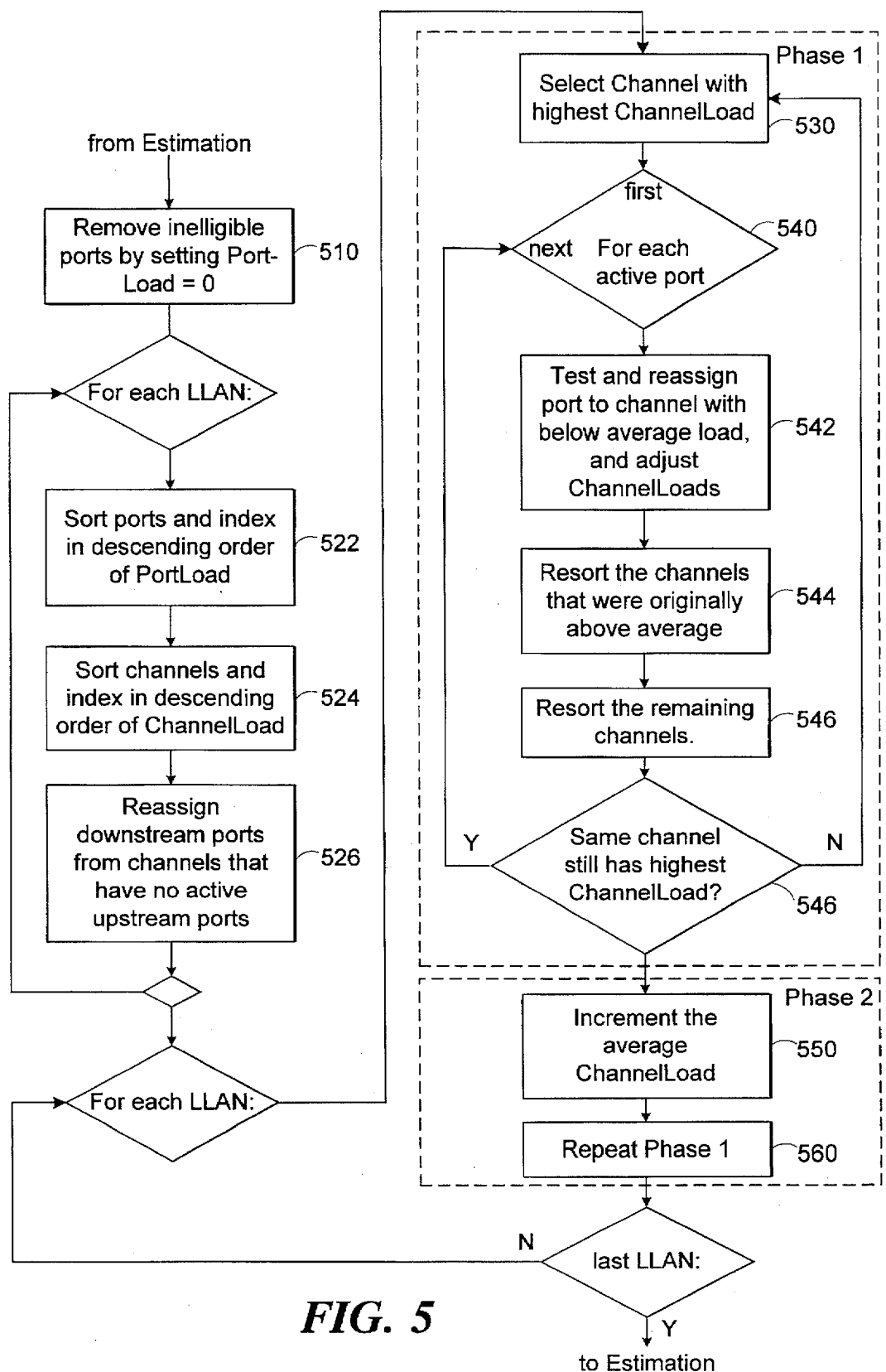
FIG. 5 is a flow chart showing the port assignment process of the method of balancing network traffic shown in FIG. 4.

FIGS. 4 and 5 provide a flow diagram describing the load balancing process in accordance with one embodiment of the invention. FIG. 4 shows the load balancing process including the configuration, the estimation and the port assignment procedures. FIG. 5 shows the port assignment procedure in detail.

Configuration

In the preferred implementation, the stored program 200 bases its assignment of ports on a construct herein referred to as a Logical LAN (LLAN). A Logical LAN is a grouping of network repeater channels that constitute a pool, or equivalency class, for the purpose of automated port switching. Within an equivalency class, network devices, such as workstations, can be moved from any network repeater channel in the class to any other network repeater channel in the class. The network devices connected to a LLAN are herein referred to as connection equivalent network devices because their requirements for connection to network resources is equivalent. In order to maintain the integrity of the network's structure, port switching may occur only within a LLAN and not among LLANs.

For example, if the three channel port switching hub in FIG. 3 had channels 1 and 3 assigned to Logical LAN #1 (LLAN 1) and channel 2 assigned to Logical LAN #2 (LLAN 2), ports could be reassigned from channel 1 to channel 3, and vice versa, but not to channel 2. Ports from channel 2 could not be reassigned to either of channels 1 or 3. Before the estimation procedure begins, the program 200 associates channels and ports with Logical LANs.

In addition to being associated with a LLAN, the network ports of each LLAN are defined as being either upstream ports or downstream ports. In one embodiment, traffic may flow bidirectionally, that is, from downstream ports to upstream ports, and vice versa. Generally, downstream ports are connected to network resource users, such as workstations, that primarily communicate only with systems connected to upstream ports. Typically, network resources, such as servers and print queues are connected to upstream ports and do not normally initiate traffic for downstream ports.

As shown in FIG. 4, the configuration procedure begins with the assignment of channels to LLANs 410 and the designation of ports as upstream or downstream 415. The ports that are designated to participate in the load balancing process are unlocked in step 420. Locked ports cannot be reassigned and do not participate in load balancing.

In the preferred embodiment, the assignment of channels that make up each LLAN 410 and the designation of ports as upstream and downstream 415 are performed by the network administrator during the port switching hub setup process. In addition, the non-assignable or fixed port of each repeater channel is predefined to be an upstream port. During the port switching hub setup, the network administrator can also lock a port, thereby preventing the programmable controller from reassigning that port to a different repeater channel. In the software implementation, each repeater channel is associated with one or more attribute registers (or program variables) which contain bit mapped data designating each associated repeater channel with a specific LLAN and each network port is associated with one or more attribute registers (or program variables) which contain for example, bit mapped data designating each associated network port as upstream, downstream or locked.

Estimation

The estimation procedure begins by recording the current contents of port traffic counters 425 of the port subsystems. The port traffic counters can be counters of octets, frames or other measures of network traffic, from each of port subsystems 104. In the preferred embodiment, the total number of octets (bytes) received from the network device connect to each port is counted by the associated port subsystem for that port. At some later time, herein referred to as the counting time interval 430, each of the port subsystem counters are read again 435 and the difference is computed and herein referred to as the PortLoad 440 for each port. Preferably, the counting time interval is assumed be short enough that the counters will have overflowed at most once. In the preferred embodiment, the counting time interval is set to be equal to the adjustment time interval.

For each internal repeater channel, the sum of the PortLoads for each network port connected to that channel, herein referred to as the ChannelLoad, is determined in step 440. To facilitate modeling, the ServerLoad for each repeater channel is determined as the sum of the upstream PortLoads (traffic received by the upstream ports from upstream network devices) of each repeater channel is also determined in step 440.

The PortLoads of each downstream network port are adjusted in step 445 by adding an estimate of the upstream traffic attributable to the network port. In the preferred embodiment, the Adjusted PortLoad (APortLoad) is determined by the equation:

$$APortLoad = PortLoad + \left( ServerLoad \times \frac{PortLoad}{ChannelLoad - ServerLoad} \right)$$

For each LLAN that has at least one channel assigned to it, the Average ChannelLoad (AChannelLoad) is determined in step 450 by the equation:

$$AChannelLoad = \frac{\Sigma \, ChannelLoad}{LLAN \, ChannelCount}$$

where the LLAN ChannelCount in the denominator is the number of channels in the LLAN that have active upstream ports.

Port Assignment

At the beginning of the port assignment procedure 500, at step 510, ports are removed from participation in the assignment process if they have failed, have reported no traffic during a specified period, have partitioned, have been administratively disabled, or have been administratively removed from participation. In the preferred embodiment, they are removed by setting the associated APortLoad to zero.

For each LLAN, the assigned ports are then sorted and indexed in descending order of APortLoad in step 522. Similarly in step 524, the channels that belong to each LLAN are sorted and indexed in descending order of ChannelLoad.

In the preferred embodiment, downstream participating ports assigned to channels that no longer have operational or active upstream ports are reassigned to channels having active upstream port in step 526. This feature allows the port switching hub to automatically restore a portion of the network if the bridge or router supporting that portion fails or is taken out of service. Each such port, in order starting with the one with the smallest APortLoad, is reassigned to the channel in that Logical LAN that has an operational upstream port and the smallest ChannelLoad. After the port is reassigned, the channels are resorted as above and the process is repeated until all ports are assigned to channels with active upstream ports. If the number of such channels is exactly one, this step is omitted.

Following the reassignment of ports from inactive channels described above, a two phase process of load balancing is executed for each Logical LAN.

Phase 1

For each channel that has an above average ChannelLoad at 530, each port that is participating is evaluated at 542 to determine whether, if its APortLoad were added to the ChannelLoad of the channel with the smallest ChannelLoad, that channel would still have a ChannelLoad below the average. If such a port is found, the port is reassigned to the new channel, and the ChannelLoads are adjusted to reflect the change. Then, the channels that originally had an above average load are sorted, 544, and the remaining channels are separately sorted, 546, each category in order of ChannelLoad. If the sorting resulted in a change in which channel that had the highest ChannelLoad, then the phase continues with the ports of that channel, 548. Otherwise, it continues with the next port of the same channel or the first port of the next channel in order of ChannelLoad at 540. The process continues until no ports can be reassigned from any channel.

Phase II

The average channel load is incremented by an amount equal to the average of differences between the ChannelLoad of each of the channels that both have a ChannelLoad that is below the average and also had a below average ChannelLoad when the process began, 550.

Then Phase I is repeated at 560 until no ports can be reassigned at which point the Port Assignment procedure is completed.

After completion of the balancing process the controller takes no action with respect to that LLAN for a predefined time interval, herein referred to as the adjustment time interval and then the balancing process is repeated.

Figure 6:
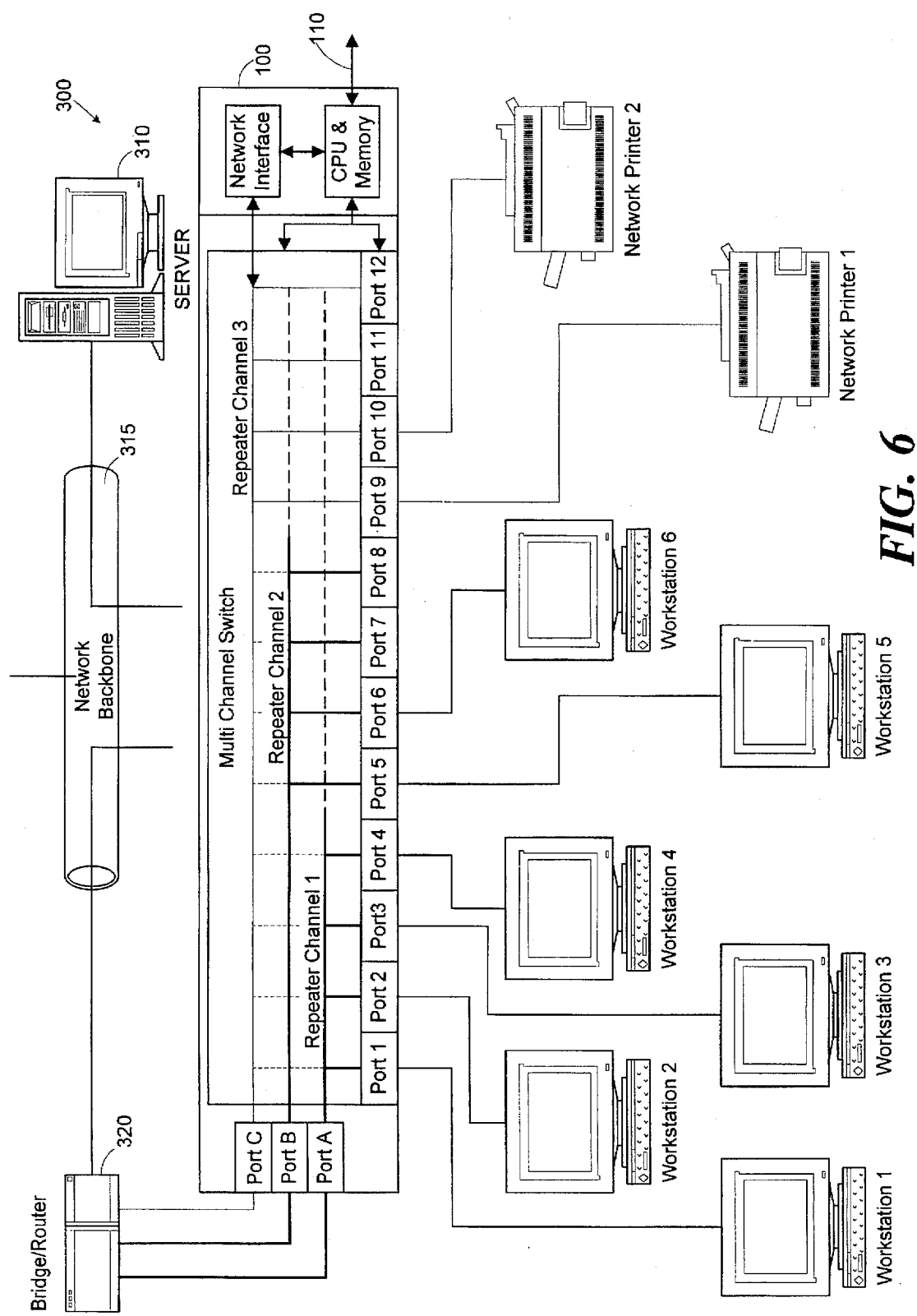
FIGS. 6 and 7 are block diagrams showing the network connections in a LAN embodying a load balancing port switching hub in accordance with the invention before and after load balancing.
Figure 7:
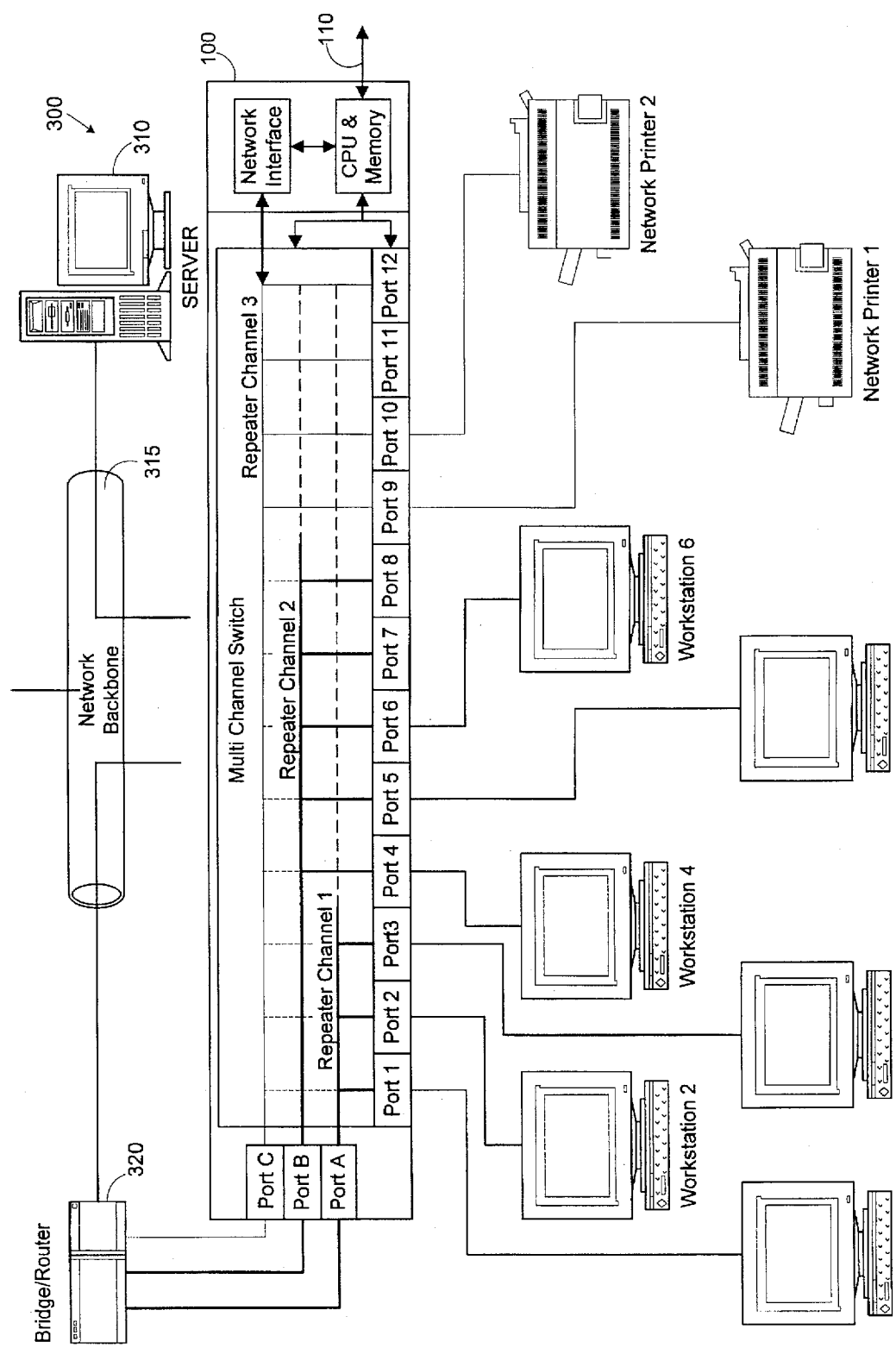

FIGS. 6 and 7 show, in an illustrative example, the connections to the port switching hub of FIG. 3 before and after load balancing. The process begins with the configuration procedure in which repeater channels are assigned to Logical LANs and ports are designated as upstream ports or downstream ports. For the purpose of this example, repeater channels 1 and 2 of the port switching hub are all defined to be part of the same Logical LAN, thus only ports 1–6 can be connected to either repeater channel 1 or repeater channel 2. In accordance with the invention, the port switching hub will attempt to redistribute the network traffic loads created by workstations 1–6 at ports 1–6 between repeater channel 1 and repeater channel 2. Ports A and B are designated as upstream ports because they are connected to network resources (the server) through the bridge/router. Ports 1–6 are designated as downstream ports because they are connected to network workstations which utilize network resources.

The estimation procedure begins by recording initial values, in this example octets or bytes, in the port traffic counters for ports 1–6 and starting the interval timer. After one measurement period, the final values in the port traffic counters are recorded. The initial value of each port counter is subtracted from the final value of each port counter to determine the PortLoad for each port. In this example, the PortLoads for each port are provided in Table 1 below. The ChannelLoad for each repeater channel 1 is sum of all the PortLoads of ports connected to that channel. Thus the ChannelLoad for repeater channel 1 is (500+50+10+10 +30 =) 600 and the ChannelLoad for repeater channel 2 is (100+75+25 =) 200. The ServerLoad is the sum of the PortLoad for Channels A and B, 500+100=600. The adjusted PortLoads shown in Table 1 are calculated from the initial PortLoad data. The average ChannelLoad for the Logical LAN is the sum of all the initial PortLoads (800) for ports 1–6, A and B divided by the number of repeater channels (2), or 400.

TABLE 1

| Port | PortLoad | Adjusted PortLoad |
| --- | --- | --- |
| A | 500 | — |
| B | 100 | — |
| 1 | 50 | 300 |
| 2 | 10 | 60 |
| 3 | 10 | 60 |
| 4 | 30 | 180 |
| 5 | 75 | 150 |
| 6 | 25 | 50 |

The process continues with the port assignment procedure. In this example, all the ports are enabled for reassignment and both of the upstream ports are active and operational. Phase 1 of the port assignment begins by determining the repeater channel or channels that have an above average ChannelLoad. In this example, repeater channel 1 has a ChannelLoad of 600 which is above the average of 400. Next the adjusted PortLoad of each port of repeater channel 1 is evaluated to determine if it can be added to the Channel load of a repeater channel having a below average ChannelLoad without raising the ChannelLoad above average. Preferably, this comparison is performed in order starting with the port having the greatest PortLoad. Thus, the adjusted PortLoad of port 1, 300 is evaluated to determine whether it can be added to the ChannelLoad of repeater channel 2, 200 to determine whether the resulting ChannelLoad 500 is greater than the calculated average ChannelLoad 400. Port 1 cannot be reassigned to repeater channel 2 because it will raise the ChannelLoad of repeater channel 2 above 400. Port 4 is considered next because it has the next greatest adjusted PortLoad, 180. The sum of the PortLoad of port 4 (180) and the ChannelLoad of repeater channel 2 (200) is less than the average ChannelLoad (400), thus port 4 can be reassigned to repeater channel 2. At this point, port 4 is reassigned to repeater channel 2 and the ChannelLoad of repeater channels 1 and 2 are adjusted to reflect the reassignment of port 4, thus the ChannelLoads become 420 and 380 respectively. The process is continued with the remaining ports of repeater channel 1. No further reassignments occur because all remaining ports have an adjusted PortLoad greater than 20.

In Phase II of the port assignment procedure, the average ChannelLoad is incremented by an amount equal to the average of the differences between the ChannelLoad of each repeater channel that has a below average ChannelLoad. Thus, the average Channel load is incremented (by 400–380=20) and becomes 420. At this point Phase I is repeated. In this example, no ports are reassigned because both repeater channels have a ChannelLoad that is equal to or below the adjusted average ChannelLoad (420 and 380<= 420). The load balancing process is complete. In the preferred embodiment, the adjustment time interval is adjustable from 30 seconds to 50 minutes. Typically, the adjustment time interval is determined based upon the character of the network environment and the requirements of the users. Where users sporadically create high network traffic loads, it is desirable to set the adjustment time interval to a relatively short period of time, for example 1 to 2 minutes. Alternatively, in a network environment such as a college campus, where the character of the network environment changes according to the time of day, i.e. the faculty produce the bulk of the network traffic during the day and the students produce the bulk of the network traffic during the remaining periods, it may be desirable to set the adjustment time interval to a relatively long period of time, for example 1 to 3 hours.

In an alternative embodiment, ports may be assigned to repeater channels or to LLANs based on the network address information of the network device detected by the port electronics. The choice of repeater channel could be based on tabular data loaded into the hub or on rules embodied in the stored program. In the case that the repeater channel assignment is made to a LLAN, further assignment to a repeater channel could be based on the load balancing mechanism described herein.

In the preferred embodiment, the load balancing hub is based on a number of ATT1RX04 Quad Single Port Repeaters available from Lucent Technologies, Allentown, Pa. The Single Port Repeaters are connected together using a number of ATT1S04 switching circuits developed by Lucent Technologies, Allentown, Pa. and controlled by a programmable controller based on an MC68340 microprocessor available from Motorola Corp., Austin, Tex. The hub includes eight repeater channels and a variable number of network ports, configurable from 24 to 128. The preferred embodiment of the invention consists of a program for the MC68340 written in the "C" programming language and designed for execution as a separate task along with those controlling other prior art functions of the controller. An example of such a program is provided in the attached Appendix A. The preferred embodiment supports estimation counting interval ranging from upward from 10 seconds and as many as eight Logical LANs.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

Appendix A

```
/* @(#)loadbalance.c    1.7    10/16/96 */
/**********************************************************************/
/*                                                                    */
/* Copyright (c) 1996 LANart Corp.                                    */
/*                                                                    */
/* PROPRIETARY RIGHTS of LANart are involved in the                   */
/* subject matter of this material.  All manufacturing, reproduction, */
/* use, and sales rights pertaining to this subject matter are governed */
/* by the license agreement.  The recipient of this software implicitly */
/* accepts the terms of the license.                                  */
/*                                                                    */
/**********************************************************************/

/**********************************************************************/
/*                                                                    */
/* FILE NAME                                                          */
/*                                                                    */
/*    loadbalance.c                                                   */
/*        Version 1.7    Date 10/16/96                                */
/*                                                                    */
/*    Contains code to implement special Repeater Management Function */
/*    of Load Balancing.                                              */
/*                                                                    */
/**********************************************************************/ include <latypes.h>
include "nucleus.h"
#include "repman.h"
#include "loadbalance.h"
#include "lamc.h"
#include "mc.h"
#include "init.h"

/*
 * LoadBalanceControl
 *
 * Description:
 *   Called upon when a change to the following mib objects is performed:
 *       laRptrLoadBalance, laRptrLoadBalanceMetric1, laLlanChLlanIndex,
 *       laRptrPortChIndex, laRptrPortUpstream, laRptrPortLock.
 *   Will send message to RepMan task of the change when appropriate.
 *
 * Parameters:
 *   LBC_Reason - the defined reason this function was called.
 *
 * Returns:
 *   none
 *
 */
void LoadBalanceControl(I8_t LBC_Reason)
{
```

[LALL-113]                              -1-

Appendix A

```
STATUS status;
U32_t LBC_MSG;

/*
 * If the RepMan task is not ready, then just return.  Needed to ignore
 * calls to this function during EErestore caused by reset or power-up.
 */
if (!LBinfo.ControlReadyFlag)
  return;

/*
 * Using the reason code this function was called, send a message to
 * the RepMan as needed.
 */
switch (LBC_Reason)
   {
      case LBC_LOAD_BALANCE:
         {
            /*
             * Determine the message to send to RepMan (START or STOP)
             */
            switch (loadBalance.laRptrLoadBalance)
               {
                  case LoadBalance_ON:
                     {
                        LBC_MSG = MSG_START_LOAD_BALANCE;
                        break;
                     }
                  case LoadBalance_OFF:
                  case LoadBalance_OTHER:
                  default:
                     {
                        LBC_MSG = MSG_STOP_LOAD_BALANCE;
                        break;
                     }
               }
            /*
             * Send message to RepMan; if message queue is full, then wait 100ms
             * and retry sending message to queue.
             */
            status = NU_QUEUE_FULL;
            while (status == NU_QUEUE_FULL)
               {
                  status = NU_Send_To_Queue(&Queue_REPMAN, &LBC_MSG, 1, NU_NO_SUSPEND);
                  switch (status)
                     {
                        case NU_SUCCESS:
                           {
                              break;
                           }
                        case NU_QUEUE_FULL:
                           {
```

[LALL-113]                        -2-

Appendix A

```
                NU_Sleep(10);
                break;
              }
            default:
              {
                printf("\n ERROR: Could Not Send Message To RepMan Task.\n");
                break;
              }
          }
        }
      break;
    }
  case LBC_LOAD_BALANCE_METRIC1:
    {
      /*
       * Only send message to RepMan if Load Balancing is ON and we are NOT in
       * the Load Balancing period (period in which we analyze and switch ports).
       */
      if ((loadBalance.laRptrLoadBalance == LoadBalance_ON) &&
(LBinfo.InLoadBalPeriodFlag == FALSE))
        {
          /*
           * Send message to RepMan; if message queue is full, then wait 100ms
           * and retry sending message to queue.
           */
          status = NU_QUEUE_FULL;
          while (status == NU_QUEUE_FULL)
            {
              LBC_MSG = MSG_RESTART_LOAD_BALANCE;
              status = NU_Send_To_Queue(&Queue_REPMAN, &LBC_MSG, 1, NU_NO_SUSPEND);
              switch (status)
                {
                  case NU_SUCCESS:
                    {
                      break;
                    }
                  case NU_QUEUE_FULL:
                    {
                      NU_Sleep(10);
                      break;
                    }
                  default:
                    {
                      printf("\n ERROR: Could Not Send Message To RepMan Task.\n");
                      break;
                    }
                }
            }
        }
      break;
    }
  case LBC_CH_LLAN_INDEX:
```

[LALL-113]

Appendix A

```
case LBC_PORT_CH_INDEX:
case LBC_PORT_UPSTREAM:
case LBC_PORT_LOCK:
    {
      /*
       * Only send message to RepMan if Load Balancing is ON and we are NOT in
       * the Load Balancing period (period in which we analyze and switch ports).
       */
        if ((loadBalance.laRptrLoadBalance == LoadBalance_ON) &&
(LBinfo.InLoadBalPeriodFlag == FALSE))
          {
            /*
             * Send message to RepMan only if we have not already sent one
(LBinfo.MessageSentFlag=FLASE).
             * This is done to prevent 120 messages from being sent to RepMan when a
Terminal Manager
             * command such as "disable lock all" is executed.  If message queue is
full, then
wait
             * 100ms and retry sending message to queue.
             */
            if (!LBinfo.MessageSentFlag)
              {
                status = NU_QUEUE_FULL;
                while (status == NU_QUEUE_FULL)
                  {
                    LBC_MSG = MSG_RECOMPUTE_LOAD_BALANCE_STATE;
                    status = NU_Send_To_Queue(&Queue_REPMAN, &LBC_MSG, 1,
NU_NO_SUSPEND);
                    switch (status)
                      {
                        case NU_SUCCESS:
                          {
                            LBinfo.MessageSentFlag = TRUE;
                            break;
                          }
                        case NU_QUEUE_FULL:
                          {
                            NU_Sleep(10);
                            break;
                          }
                        default:
                          {
                            printf("\n ERROR: Could Not Send Message To RepMan
Task.\n");
                            break;
                          }
                      }
                  }
              }
          }
        break;
```

Appendix A

```
      }
    } return;
}

/*
 * LoadBalanceDetermineState
 *
 * Description:  Determines the next state of load balancing by using a 2 phase
 *    process.  Additionally: for each LLAN, it records the number of channels
 *    assigned to that LLAN; for each channel, it records the LLAN number to
 *    which the channel is assigned.
 *
 * Parameters:
 *    none
 *
 * Returns:
 *    none
 *
 */
void LoadBalanceDetermineState(void)
{
  ObjRef_t objRef;
  ObjValue_t objVal;
  U8_t NumOfGroups, NumOfPorts;
  U8_t PrtStatus;
  U32_t OperStatus;
  U8_t i, j;

/*
   * Assume the next load balancing state is disabled.
   */
  LBinfo.NextState = FALSE;

/*
   * P H A S E   I
   * Loop through all channels incrementing the ChannelCount in their respective
   * LLAN. If ChannelCount for a LLAN is greater than 1, then NextState is
   * enabled for Phase I.
   */ for (i=0; i<MAX_LLANS; i++)
    {
      LBinfo.LBllan[i].ChannelCount = 0;
    } for (i=0; i<MAX_CHANNELS; i++)
    {
      LBinfo.LBchannel[i].ChLlanIndex = 0;
```

Appendix A

```c
      objRef.Name = mib_laLlanChLlanIndex;
      objRef.InstComps = 1;
      objRef.Instance[0] = i+1;
      if (MC_GetObject(&objRef, &objVal) == SS_SUCCESS)
         {
            LBinfo.LBchannel[i].ChLlanIndex = objVal.Value.Integer;
            LBinfo.LBllan[objVal.Value.Integer-1].ChannelCount++;
            if (LBinfo.LBllan[objVal.Value.Integer-1].ChannelCount > 1)
               LBinfo.NextState = TRUE;
         }
   }

/*
 * P H A S E   I I
 * If NextState is ENABLED by Phase I, then for each port determine whether this
 * port can participate in Load Balancing by meeting the following criteria:
 *    Port is operational (rptrPortOperStatus == ENABLED)
 *    Port is downstream, unlocked, does not indicate link-test-failure,
 *      no-activity, and is not partitioned (laRptrOperStatus)
 * If it can, then increment the LoadBalPortCount for the LLAN that the port
 * is associated with.  If the LoadBalPortCount and the ChannelCount for the
 * LLAN is greater than 1, then NextState is TRUE (enabled).
 */
if (LBinfo.NextState)
   {
      LBinfo.NextState = FALSE;       /* Initialize NextState to FALSE */ for (i=0; i<MAX_LLANS; i++)
         LBinfo.LBllan[i].LoadBalPortCount = 0;

objRef.Name = mib_rptrGroupCapacity;
      objRef.InstComps = 1;
      objRef.Instance[0] = 0;
      if (MC_GetObject(&objRef, &objVal) == SS_SUCCESS)
         NumOfGroups = objVal.Value.Integer;
      else
         NumOfGroups = 0;

for (i=1; i<=NumOfGroups; i++)
         {
            objRef.Name = mib_rptrGroupPortCapacity;
            objRef.InstComps = 1;
            objRef.Instance[0] = ((NumOfGroups == 2) && (i == 2)) ? (i+1) : (i);
            if (MC_GetObject(&objRef, &objVal) == SS_SUCCESS)
               NumOfPorts = objVal.Value.Integer;
            else
               NumOfPorts = 0;

for (j=1; j<=NumOfPorts; j++)
               {
                  objRef.Name = mib_rptrPortOperStatus;
                  objRef.InstComps = 2;
```

[LALL-113]              -6-

Appendix A

```
        objRef.Instance[0] = ((NumOfGroups == 2) && (i == 2)) ? (i+1) : (i);
        objRef.Instance[1] = j;
        if (MC_GetObject(&objRef, &objVal) == SS_SUCCESS)
          PrtStatus = objVal.Value.Integer;
        else
          PrtStatus = NOT_OPERATIONAL;

objRef.Name = mib_laRptrPortOperStatus;
        objRef.InstComps = 2;
        objRef.Instance[0] = ((NumOfGroups == 2) && (i == 2)) ? (i+1) : (i);
        objRef.Instance[1] = j;
        if (MC_GetObject(&objRef, &objVal) == SS_SUCCESS)
          OperStatus = objVal.Value.Integer;
        else
          OperStatus = STAT_LINKTESTFAILED_BITMASK;

if ((PrtStatus == OPERATIONAL) &&
                    ((OperStatus & (STAT_PORTLOCK_BITMASK |
                                    STAT_PORTUPSTREAM_BITMASK |
                                    STAT_LINKTESTFAILED_BITMASK |
                                    STAT_NOACTIVITYDETECTED_BITMASK |
                                    STAT_AUTOPARTITIONED_BITMASK)) == 0))
        {
          objRef.Name = mib_laLlanPortLlanIndex;
          objRef.InstComps = 2;
          objRef.Instance[0] = ((NumOfGroups == 2) && (i == 2)) ? (i+1) : (i);
          objRef.Instance[1] = j;
          if (MC_GetObject(&objRef, &objVal) == SS_SUCCESS)
            {
              LBinfo.LBllan[objVal.Value.Integer-1].LoadBalPortCount++;
              if ((LBinfo.LBllan[objVal.Value.Integer-1].LoadBalPortCount > 1)
 &&
                        (LBinfo.LBllan[objVal.Value.Integer-1].ChannelCount >
1))
                LBinfo.NextState = TRUE;
            }
        }
      }
    }
  } return;
}

/*
 * LoadBalanceSetup
 *
 * Description:
 *   Called upon when a snapshot of the readable octets counter for all ports is
needed.
 *
```

[LALL-113]                            -7-

Appendix A

```
 * Parameters:
 *    None
 *
 * Returns:
 *    None
 *
 */
void LoadBalanceSetup(void)
{
  ObjRef_t objRef;
  ObjValue_t objVal;
  U8_t NumOfGroups, NumOfPorts;
  U32_t i, j;

for (i=0; i<TOTAL_PORTS; i++)
    {
      LBinfo.LBport[i].Group = 0;
      LBinfo.LBport[i].Port = 0;
      LBinfo.LBport[i].PortLoad = 0;
    }

/*
   * For each port on the SegWay stack, record the group#, port#, and readable octets
   * counter in the PortInfo data structure.  The variable PortCount will keep track
   * of the number of ports in the stack.
   */

LBinfo.PortCount = 0;

objRef.Name = mib_rptrGroupCapacity;
  objRef.InstComps = 1;
  objRef.Instance[0] = 0;
  if (MC_GetObject(&objRef, &objVal) == SS_SUCCESS)
    NumOfGroups = objVal.Value.Integer;
  else
    NumOfGroups = 0;

for (i=1; i<=NumOfGroups; i++)
    {
      objRef.Name = mib_rptrGroupPortCapacity;
      objRef.InstComps = 1;
      objRef.Instance[0] = ((NumOfGroups == 2) && (i == 2)) ? (i+1) : (i);
      if (MC_GetObject(&objRef, &objVal) == SS_SUCCESS)
        NumOfPorts = objVal.Value.Integer;
      else
        NumOfPorts = 0;

for (j=1; j<=NumOfPorts; j++)
        {
          objRef.Name = mib_rptrMonitorPortReadableOctets;
          objRef.InstComps = 2;
          objRef.Instance[0] = ((NumOfGroups == 2) && (i == 2)) ? (i+1) : (i);
```

[LALL-113]                            -8-

Appendix A

```
            objRef.Instance[1] = j;
            if (MC_GetObject(&objRef, &objVal) == SS_SUCCESS)
               {
                  LBinfo.LBport[LBinfo.PortCount].Group = ((NumOfGroups == 2) && (i == 2))
? (i+1) : (i);
                  LBinfo.LBport[LBinfo.PortCount].Port = j;
                  LBinfo.LBport[LBinfo.PortCount].PortLoad = objVal.Value.Integer;
                  LBinfo.PortCount++;
               }
         }
    }

/*
   * Set the valid data flag to indicate valid values to the LoadBalance() function.
   */

LBinfo.ValidDataFlag = 1;

return;
}

/*
 * LoadBalancePortSort
 *
 * Description:
 *    Called upon to sort ports participating in load balancing in descending order
 *    according to the associated readable octets counter.
 *
 * Parameters:
 *    count - the number of ports that will be sorted
 *
 * Returns:
 *    None
 *
 */
void LoadBalancePortSort(U32_t count)
{
  U32_t pass, i;
  U8_t SwapFlag;

/*
   * Check the port load of the current port to the one under it; If it is less
   * than the port under it, then swap the ports.
   */ for (pass = 0; pass < (count - 1); pass++)
     {
        SwapFlag = 0;
        for (i=0; i < (count - pass - 1); i++)
           if (LBinfo.LBport[i].PortLoad < LBinfo.LBport[i+1].PortLoad)
              {
```

[LALL-113]                          -9-

Appendix A

```
            LoadBalancePortSwap(i, i+1);
            SwapFlag = 1;
          }
      if (SwapFlag == 0)
         break;
    }
}

/*
 * LoadBalancePortSwap
 *
 * Description:
 *   Called upon to swap the group#, port#, and port load values of 2 ports.
 *
 * Parameters:
 *   a - the index of the port that will swapped with b
 *   b - the index of the port that will swapped with a
 *
 * Returns:
 *   None
 *
 */
void LoadBalancePortSwap(U32_t a, U32_t b)
{
  U8_t tempGroup, tempPort;
  U32_t tempLoad;

/*
   * Place the values of port "a" into temp*, move the values of port "b" into the
   * location of port "a", then place temp* into the location of port "b".
   */ tempGroup = LBinfo.LBport[a].Group;
  tempPort  = LBinfo.LBport[a].Port;
  tempLoad  = LBinfo.LBport[a].PortLoad;

LBinfo.LBport[a].Group    = LBinfo.LBport[b].Group;
  LBinfo.LBport[a].Port     = LBinfo.LBport[b].Port;
  LBinfo.LBport[a].PortLoad = LBinfo.LBport[b].PortLoad;

LBinfo.LBport[b].Group    = tempGroup;
  LBinfo.LBport[b].Port     = tempPort;
  LBinfo.LBport[b].PortLoad = tempLoad;
}

/*
 * LoadBalance
 *
```

[LALL-113]

Appendix A

```
* Description:
*   Called upon when channels within the same Logical LAN need to be load balanced.
*
* Parameters:
*   None
*
* Returns:
*   None
*
*/
void LoadBalance(void)
{
  ObjRef_t objRef;
  ObjValue_t objVal;
  U8_t NumOfGroups, NumOfPorts;
  U8_t PrtStatus, ChannelIndex;
  U8_t CurrAboveAvgChannel;
  U8_t BelowAvgChCount, BelowAvgChIndex;
  U8_t LlanChCount;
  U8_t pass;
  U32_t OperStatus;
  U32_t LoadBelowAvg;
  U32_t i, j, k;

LBinfo.InLoadBalPeriodFlag = TRUE;    /* Set the beginning of Load Balancing */

/*
   * For each channel:
   *   Initialize values for channel load, server load, and UpLinkOperational.
   */
  for (i=0; i<MAX_CHANNELS; i++)
    {
      LBinfo.LBchannel[i].ChannelLoad = 0;
      LBinfo.LBchannel[i].ServerLoad = 0;
      LBinfo.LBchannel[i].UpLinkOperational = FALSE;
    }

/*
   * For each port:
   *              Calculate the delta for the readable octets and store in PortLoad.
   *              Add the delta value from PortLoad to the associated ChannelLoad.
   *              If Upstream port, then add PortLoad to associated ServerLoad, check
   *              operational status of port, and set UpLinkOperational flag to
signal
   *              that the associated channel has a good up-link.
   */
  for (i=0; i<LBinfo.PortCount; i++)
    {
      /*
       * Calculate port load by subtracting the value of the previous reading of the
       * readable octets counter from the current value.
       */
```

[LALL-113]                              -11-

Appendix A

```
        objRef.Name = mib_rptrMonitorPortReadableOctets;
        objRef.InstComps = 2;
        objRef.Instance[0] = LBinfo.LBport[i].Group;
        objRef.Instance[1] = LBinfo.LBport[i].Port;
        if (MC_GetObject(&objRef, &objVal) == SS_SUCCESS)
           {
             /*
              * If counter has turned over then substract previous port load from maximum
              * counter value before adding it to the value of the readable octets
counter.
              */
             if (LBinfo.LBport[i].PortLoad > objVal.Value.Integer)
               LBinfo.LBport[i].PortLoad = objVal.Value.Integer +
                                             (MAX_COUNTER - LBinfo.LBport[i].PortLoad);
             else
                 LBinfo.LBport[i].PortLoad = objVal.Value.Integer -
LBinfo.LBport[i].PortLoad;
           }
        else
           {
              LBinfo.LBport[i].PortLoad = 0;
           }

/*
         * Add the port load to the channel load of the channel to which this port is
assigned
         */
        objRef.Name = mib_laRptrPortChIndex;
        objRef.InstComps = 2;
        objRef.Instance[0] = LBinfo.LBport[i].Group;
        objRef.Instance[1] = LBinfo.LBport[i].Port;
        if (MC_GetObject(&objRef, &objVal) == SS_SUCCESS)
           {
              ChannelIndex = objVal.Value.Integer;
              LBinfo.LBchannel[ChannelIndex-1].ChannelLoad += LBinfo.LBport[i].PortLoad;
           }

/*
         * If an upstream port, add port load to the server load of the associated
channel.
         * Check operational status of upstream port (enabled, link test passed, not
         * partitioned, and shows activity).  If it is, then set the UpLinkOperational
         * flag for the associated channel.
         */
        objRef.Name = mib_laRptrPortUpstream;
        objRef.InstComps = 2;
        objRef.Instance[0] = LBinfo.LBport[i].Group;
        objRef.Instance[1] = LBinfo.LBport[i].Port;
        if (MC_GetObject(&objRef, &objVal) == SS_SUCCESS)
           {
               if (objVal.Value.Integer == ENABLED)
                 {
```

[LALL-113]                                  -12-

Appendix A

```
            LBinfo.LBchannel[ChannelIndex-1].ServerLoad += LBinfo.LBport[i].PortLoad;

objRef.Name = mib_rptrPortOperStatus;
            objRef.InstComps = 2;
            objRef.Instance[0] = LBinfo.LBport[i].Group;
            objRef.Instance[1] = LBinfo.LBport[i].Port;
            if (MC_GetObject(&objRef, &objVal) == SS_SUCCESS)
               {
                  if (objVal.Value.Integer == OPERATIONAL)
                     {
                        objRef.Name = mib_laRptrPortOperStatus;
                        objRef.InstComps = 2;
                        objRef.Instance[0] = LBinfo.LBport[i].Group;
                        objRef.Instance[1] = LBinfo.LBport[i].Port;
                        if (MC_GetObject(&objRef, &objVal) == SS_SUCCESS)
                           {
                              if ((objVal.Value.Integer & (STAT_LINKTESTFAILED_BITMASK |
                                                           STAT_NOACTIVITYDETECTED_BITMASK |
                                                           STAT_AUTOPARTITIONED_BITMASK))
 == 0)
                                 {
                                    LBinfo.LBchannel[ChannelIndex-1].UpLinkOperational =
TRUE;
                                 }
                           }
                     }
               }
         }
      }

/*
    * For downstream ports, adjust port load by a pro-rated amount of the channel load
    * not attributable to clients on this SegWay.  The following formula is used:
    *
    *                        PortLoad * ServerLoad
    *   PortLoad = PortLoad + -----------------------
    *                        ChannelLoad - ServerLoad
    *
    * When we multiply PortLoad * ServerLoad the result can be greater than the value
    * that a 32 bit counter can hold.  Therefore, we need modify the above formula
    * as follows:
    *
    *                              PortLoad
    *   PortLoad = PortLoad + ------------------------------- * (ServerLoad / 100)
    *                        (ChannelLoad - ServerLoad) / 100
    */
   for (i=0; i<LBinfo.PortCount; i++)
      {
         objRef.Name = mib_laRptrPortChIndex;
         objRef.InstComps = 2;
```

[LALL-113]                                -13-

Appendix A

```
      objRef.Instance[0] = LBinfo.LBport[i].Group;
      objRef.Instance[1] = LBinfo.LBport[i].Port;
      if (MC_GetObject(&objRef, &objVal) == SS_SUCCESS)
         {
            ChannelIndex = objVal.Value.Integer;

objRef.Name = mib_laRptrPortUpstream;
            objRef.InstComps = 2;
            objRef.Instance[0] = LBinfo.LBport[i].Group;
            objRef.Instance[1] = LBinfo.LBport[i].Port;
            if (MC_GetObject(&objRef, &objVal) == SS_SUCCESS)
               {
                  if ((objVal.Value.Integer == DISABLED) &&
                     (((LBinfo.LBchannel[ChannelIndex-1].ChannelLoad -
                        LBinfo.LBchannel[ChannelIndex-1].ServerLoad) / 100) != 0))
                  {
                     LBinfo.LBport[i].PortLoad += (LBinfo.LBport[i].PortLoad /

((LBinfo.LBchannel[ChannelIndex-1].ChannelLoad -

LBinfo.LBchannel[ChannelIndex-1].ServerLoad) / 100)) *

(LBinfo.LBchannel[ChannelIndex-1].ServerLoad /100);
                  }
               }
         }
      }

/*
    * For each Logical LAN, compute the average channel load. To calculate the average
channel
    * load, we need to determine the number of channels which have an operational
up-link.
We
    * add all channel loads (even channels with non-operational up-links) and divide by
the
    * number of channels with operational uplinks. At the end, we adjust for byte flux.
    */
   for (i=0; i<MAX_LLANS; i++)
      {
      /*
       * If the number of channels on this LLAN are less than 2, then got to next LLAN.
       */
      if (LBinfo.LBllan[i].ChannelCount < 2)
         continue;

/*
       * Initialize Channel Average Load and LLAN Channel Count.
       */
      LBinfo.LBllan[i].ChAvgLoad = 0;
      LlanChCount = 0;
```

Appendix A

```
/*
 * Determine the number of channels on this LLAN with operational up-links.
 */
for (j=0; j<MAX_CHANNELS; j++)
   {
      if ((LBinfo.LBchannel[j].ChLlanIndex == (i+1)) &&
(LBinfo.LBchannel[j].UpLinkOperational))
         LlanChCount++;
   }

/*
 * If the number of channels on this LLAN with operational up-links is greater than
zero,
 * then Calculate Average Channel Load for this LLAN.
 */
if (LlanChCount > 0)
   {
      for (j=0; j<MAX_CHANNELS; j++)
         {
            if (LBinfo.LBchannel[j].ChLlanIndex == (i+1))
               LBinfo.LBllan[i].ChAvgLoad += (LBinfo.LBchannel[j].ChannelLoad +
                                             (LlanChCount - 1)) / LlanChCount;
         }

/*
       * Adjust load by (100/64)% for byte flux
       */
      if ((LBinfo.LBllan[i].ChAvgLoad + (LBinfo.LBllan[i].ChAvgLoad >> 6)) >
LBinfo.LBllan[i].ChAvgLoad)
         LBinfo.LBllan[i].ChAvgLoad += (LBinfo.LBllan[i].ChAvgLoad >> 6);
   }

/*
 * For those ports that are not participating in load balancing (ports which are
disabled,
 * upstream, locked, show link test failure, show no activity, or
auto-partititioned),
 * remove them from the list by setting their port load to 0.
 */
for (i=0; i<LBinfo.PortCount; i++)
   {
      objRef.Name = mib_rptrPortOperStatus;
      objRef.InstComps = 2;
      objRef.Instance[0] = LBinfo.LBport[i].Group;
      objRef.Instance[1] = LBinfo.LBport[i].Port;
      if (MC_GetObject(&objRef, &objVal) == SS_SUCCESS)
         PrtStatus = objVal.Value.Integer;
      else
         PrtStatus = NOT_OPERATIONAL;
```

[LALL-113]

Appendix A

```
      objRef.Name = mib_laRptrPortOperStatus;
      objRef.InstComps = 2;
      objRef.Instance[0] = LBinfo.LBport[i].Group;
      objRef.Instance[1] = LBinfo.LBport[i].Port;
      if (MC_GetObject(&objRef, &objVal) == SS_SUCCESS)
        OperStatus = objVal.Value.Integer;
      else
        OperStatus = STAT_LINKTESTFAILED_BITMASK;

if ( (PrtStatus == NOT_OPERATIONAL) || ((OperStatus &
(STAT_PORTUPSTREAM_BITMASK |
            STAT_PORTLOCK_BITMASK | STAT_LINKTESTFAILED_BITMASK |
            STAT_NOACTIVITYDETECTED_BITMASK |
STAT_AUTOPARTITIONED_BITMASK)) != 0) )
        {
          LBinfo.LBport[i].PortLoad = 0;
        }
    }

/*
   * Sort the list of ports in descending order of port load.
   */
  LoadBalancePortSort(LBinfo.PortCount);

/*
   * R O B I N    H O O D    A L G O R I T H M
   * Load Balancing Begins:  For each Llan, build an array of channels with operational
   * uplinks which are currently on the LLAN.  Find those channels which have non-
operational
   * up-links and move all the ports which participate in load balancing off that
channel to
   * channels on that LLAN which have operational up-links.  Make 2 passes through the
balancing
   * algorithm. On the first pass, we balance the channels as close to the channel
average as
we
   * can. We loop through all the channels that are above the average and trim away
ports to
the
   * We loop through all the channels that are above the average and trim away ports to
the
   * channel which has the lowest utilization.  After a port is switched, the list of
channels
   * above the average and below the average are sorted separately for fairness.  On
the
   * second pass, we increase the average channel load by the capacity of channels
below
the
   * average and load balance just like in the first pass.
   */
  for (i=0; i<MAX_LLANS; i++)
    {
```

[LALL-113]                                                                    -16-

Appendix A

```
/*
 * If this LLAN has less than 2 channels, skip it.
 */
if (LBinfo.LBllan[i].ChannelCount < 2)
  continue;

/*
 * Determine the number of channels on this LLAN which have operational up-links.
 * Store the channel number of these channels into LlanChOrder array.
 */
LlanChCount=0;
for (j=0; j<MAX_CHANNELS; j++)
  LBinfo.LlanChOrder[j] = 0;
for (j=0; j<MAX_CHANNELS; j++)
   {
      if ((LBinfo.LBchannel[j].ChLlanIndex == (i+1)) &&
(LBinfo.LBchannel[j].UpLinkOperational))
         {
            LBinfo.LlanChOrder[LlanChCount] = j+1;
            LlanChCount++;
         }
   }

/*
 * Sort the list of channels from high to low based on channel load.
 */
if (LlanChCount > 1)
   LoadBalanceChannelSort(&LBinfo.LlanChOrder[0], LlanChCount);

/*
 * If the number of channels on this LLAN which have operational up-links is greater than
 * zero and not equal to the number of channels on this LLAN, then look for channels
 * that do not have an operational uplink.
 */
if ((LlanChCount > 0) && (LlanChCount != LBinfo.LBllan[i].ChannelCount))
    {
      /*
       * For those channels with non-operational up-links, switch the port to the channel which
       * has the lowest channel utilization (last entry in LlanChOrder array) and resort the
       * list of channels with operational-uplinks.
       */
      for (j=0; j<MAX_CHANNELS; j++)
         {
            if ((LBinfo.LBchannel[j].ChLlanIndex == (i+1)) &&
(!LBinfo.LBchannel[j].UpLinkOperational))
               {
```

[LALL-113] -17-

Appendix A

```
        for (k=0; k<LBinfo.PortCount; k++)
          {
            /*
             * If the port has a load of zero, then we are done with this
channel.
             */
            if (LBinfo.LBport[k].PortLoad == 0)
              break;

objRef.Name = mib_laRptrPortChIndex;
            objRef.InstComps = 2;
            objRef.Instance[0] = LBinfo.LBport[k].Group;
            objRef.Instance[1] = LBinfo.LBport[k].Port;
            if (MC_GetObject(&objRef, &objVal) == SS_SUCCESS)
              {
                if (objVal.Value.Integer == (j+1))
                  {
                    /*
                     * Switch port to the channel with lowest utilization and
add the
                     * port load to the the channel load of this channel.
                     */
                    objRef.Name = mib_laRptrPortChIndex;
                    objRef.InstComps = 2;
                    objRef.Instance[0] = LBinfo.LBport[k].Group;
                    objRef.Instance[1] = LBinfo.LBport[k].Port;
                    objVal.Value.Integer = LBinfo.LlanChOrder[LlanChCount-1];
                    objVal.ValLen = sizeof(objVal.Value.Integer);
                    if (MC_SetObject(&objRef, &objVal, TRUE) == SS_SUCCESS)
                      {
                        LBinfo.LBchannel[LBinfo.LlanChOrder[LlanChCount-1]-
1].ChannelLoad +=
                            LBinfo.LBport[k].PortLoad;

/*
                         * Sort the channel list from high to low base on
channel load.
                         */
                        LoadBalanceChannelSort(&LBinfo.LlanChOrder[0],
LlanChCount);
                      }
                  }
              }
          }
        /*
         * If the number of channels with operational uplinks is less than 2, skip this
LLAN.
         */
```

[LALL-113]                                -18-

Appendix A

```
        if (LlanChCount < 2)
          continue;

/*
         * Set up an index which points to the start of channels that are
         * below the avarage channel load in the LlanChOrder array.
         */
        BelowAvgChIndex = 0;
        for (j=0; j<LlanChCount; j++)
           {
              if (LBinfo.LBchannel[LBinfo.LlanChOrder[j]-1].ChannelLoad <
    LBinfo.LBllan[i].ChAvgLoad)
                 {
                    BelowAvgChIndex = j;
                    break;
                 }
           }

/*
         * Load Balance using 2 passes. Pass 1 is performed normally. Pass 2 adds the
    average
    load
         * capacity below the Channel Average Load to the Channel Average Load.
         */
        for (pass=1; pass<=2; pass++)
           {
              /*
               * On the second pass, increment the average channel load by the available
    channel
               * capacity of channels below the average channel load.
               */
              if (pass == 2)
                 {
                    BelowAvgChCount = 0;
                    for (j=0; j<LlanChCount; j++)
                       {
                          if (LBinfo.LBchannel[LBinfo.LlanChOrder[j]-1].ChannelLoad <
    LBinfo.LBllan[i].ChAvgLoad)
                             {
                                LoadBelowAvg += LBinfo.LBllan[i].ChAvgLoad -
    LBinfo.LBchannel[LBinfo.LlanChOrder[j]-1].ChannelLoad;
                                BelowAvgChCount++;
                             }
                       }
                    if (BelowAvgChCount > 0)
                       LoadBelowAvg = LoadBelowAvg / BelowAvgChCount;

/* Check for overflow */
                    if ((LBinfo.LBllan[i].ChAvgLoad + LoadBelowAvg) <
    LBinfo.LBllan[i].ChAvgLoad)
                       LoadBelowAvg = 0;
```

[LALL-113]

Appendix A

```
            }
         else
            {
               LoadBelowAvg = 0;
            }

/*
          * Loop through all channels above the average channel load trimming away
          * ports to those channels that are below the average.
          */
         for (j=0; j<BelowAvgChIndex; j++)
            {
               /*
                * If the Channel Load is less than or equal to the Average Channel Load,
                * then we are done with this LLAN.
                */
               if (LBinfo.LBchannel[LBinfo.LlanChOrder[j]-1].ChannelLoad <=
    (LBinfo.LBllan[i].ChAvgLoad+LoadBelowAvg))
                  {
                     break;
                  }

/*
                * Look for a port on this channel, if the port can be switched to
                * the channel with the lowest load, then it is switched.
                */
               for (k=0; k<LBinfo.PortCount; k++)
                  {
                     /*
                      * If the port has a load of zero, then we are done with this
    channel.
                      */
                     if (LBinfo.LBport[k].PortLoad == 0)
                       break;

objRef.Name = mib_laRptrPortChIndex;
                     objRef.InstComps = 2;
                     objRef.Instance[0] = LBinfo.LBport[k].Group;
                     objRef.Instance[1] = LBinfo.LBport[k].Port;
                     if (MC_GetObject(&objRef, &objVal) == SS_SUCCESS)
                       {
                          if (objVal.Value.Integer == LBinfo.LlanChOrder[j])
                             {
                                if ((LBinfo.LBchannel[LBinfo.LlanChOrder[LlanChCount-1]-
    1].ChannelLoad
                                     + LBinfo.LBport[k].PortLoad) <=
    (LBinfo.LBllan[i].ChAvgLoad+LoadBelowAvg))
                                   {
                                      objRef.Name = mib_laRptrPortChIndex;
                                      objRef.InstComps = 2;
                                      objRef.Instance[0] = LBinfo.LBport[k].Group;
                                      objRef.Instance[1] = LBinfo.LBport[k].Port;
```

[LALL-113]

Appendix A

```
                            objVal.Value.Integer = LBinfo.LlanChOrder[LlanChCount-1];
                            objVal.ValLen = sizeof(objVal.Value.Integer);
                            if (MC_SetObject(&objRef, &objVal, TRUE) == SS_SUCCESS)
                              {
                                /*
                                 * Subtract the port load from the channel load of
the channel the port
                                 * was previously on.  Add the port load to the new
channel.
                                 */
                                LBinfo.LBchannel[LBinfo.LlanChOrder[j]-1].ChannelLoad
-=
LBinfo.LBport[k].PortLoad;
                                LBinfo.LBchannel[LBinfo.LlanChOrder[LlanChCount-1]-
1].ChannelLoad += LBinfo.LBport[k].PortLoad;

/*
                                 * Record current channel we are trimming and sort
the channel list
which
                                 * are above the average from high to low based on
channel load. The
number
                                 * of channels above the average is calculated by
subtracting the index
of
                                 * the current channel (j) from the index of the
first channel below the
                                 * average (BelowAvgChIndex).
                                 */
                                CurrAboveAvgChannel = LBinfo.LlanChOrder[j];
                                if ((BelowAvgChIndex-j) > 1)
                                  LoadBalanceChannelSort(&LBinfo.LlanChOrder[j],
BelowAvgChIndex-j);

/*
                                 * Sort the channel list which are below the average
from high to
                                 * low based on channel load. The number of channels
below the
average
                                 * is calculated by subtracting the index of the
first channel below the
                                 * (BelowAvgChIndex) from the channels (LlanChCount).
                                 */
                                if ((LlanChCount-BelowAvgChIndex) > 1)
LoadBalanceChannelSort(&LBinfo.LlanChOrder[BelowAvgChIndex], LlanChCount-
BelowAvgChIndex);

/*
                                 * If channel with highest load is below average,
```

[LALL-113]

Appendix A

```
                                        then we are done.
                                                                                */
                                                        if
(LBinfo.LBchannel[LBinfo.LlanChOrder[j]-1].ChannelLoad <=

(LBinfo.LBllan[i].ChAvgLoad+LoadBelowAvg))
                                                        {
                                                            break;
                                                        }

/*
                                                         * If sorting of channels which are above the average
resulted in a
                                                         * a new channel being analyzed, then reset port
index to 0.
                                                         */
                                                        if (CurrAboveAvgChannel != LBinfo.LlanChOrder[j])
                                                        {
                                                            k = -1;
                                                        }
                                                    }
                                                }
                                            }
                                        }
                                    }
                                }
                            }
                        }
                    }

LBinfo.InLoadBalPeriodFlag = FALSE;    /* Indicate Load Balancing End */
    return;
}

/*
 * LoadBalanceFlush
 *
 * Description:
 *    Called upon when a change in the laRptrPortChIndex, laRptrPortUpstream,
 *    or laLlanChLlanIndex object occurs which affects the results of the
 *    Load Balancing algorithm.
 *
 * Parameters:
 *    None
 *
 * Returns:
 *    None
 *
 */
void LoadBalanceFlush(void)
{
```

[LALL-113]                -22-

Appendix A

```
    LBinfo.ValidDataFlag = 0;        /* Not valid data */
}

/*
 * LoadBalanceChannelSort
 *
 * Description:  Sorts channels contained in the LBinfo.LlanChOrder[]
 *    array from high to low according to channel load.
 *
 * Parameters:
 *    count - the number of channels that will be sorted.
 *    index - the point at which sorting begins in the array.
 *
 * Returns:
 *    None
 *
 */
void LoadBalanceChannelSort(U8_t array[], U8_t count)
{
   U8_t pass, i, SwapFlag;

/*
    * Check the channel load of the current channel to the one under it;
    * If it is less than the channel under it, the swap the channels.
    */ for (pass = 0; pass < (count - 1); pass++)
      {
         SwapFlag = 0;
         for (i=0; i < (count - pass - 1); i++)
            if (LBinfo.LBchannel[array[i]-1].ChannelLoad < LBinfo.LBchannel[array[i+1]-
1].ChannelLoad)
               {
                  LoadBalanceChannelSwap(&array[i], &array[i+1]);
                  SwapFlag = 1;
               }
         if (SwapFlag == 0)
            break;
      }
}

/*
 * LoadBalanceChannelSwap
 *
 * Description:  Swaps channel a with channel b in the LBinfo.LlanChOrder[]
 *    array.
 *
 * Parameters:
```

[LALL-113]                           -23-

Appendix A

```
*    a - the index of the channel that will swapped with b
*    b - the index of the channel that will swapped with a
*
* Returns:
*    None
*
*/
void LoadBalanceChannelSwap(U8_t *a, U8_t *b)
{
  U8_t temp;

/*
   * Place the value of channel "a" into temp, move the value of channel
   * "b" into the location of channel "a", then place temp into the
   * location of channel "b".
   */ temp = *a;
  *a = *b;
  *b = temp;
}
```

[LALL-113] -24-

What is claimed is:

1. A network interconnecting device comprising:

a plurality of network ports for connecting a plurality of network devices to said network interconnecting device;

a plurality of interconnecting repeater channels, each of said interconnecting channels including repeater means for enabling each of said interconnecting channels to function as a network repeater for interconnecting two or more network devices;

switching means for selectively connecting each of said network ports to one of said plurality of interconnecting channels;

monitoring means for monitoring information characteristic of data flow through at least two of said network ports;

estimating means for producing an estimate of data flow attributable to each of said network devices as a function of said information characteristic of data flow through said network ports;

control processing means connected to said estimated means and said switching means for receiving said estimate of data now from said estimating means and for controlling said switching means in response to said characteristic information to dynamically adjust the connection of at least one of said network ports with respect to one of said interconnecting channels.

2. A network interconnecting device according to claim 1 further comprising:

means for designating at least one of said interconnecting channels as being associated with a Logical LAN (LLAN).

3. A network interconnecting device according to claim 2 wherein the network devices connected to the interconnecting channels of a LLAN are connection equivalent network devices.

4. A network interconnecting device according to claim 1 further comprising:

means for designating at least one network port as an upstream port and means for designating at least one network port as a downstream port.

5. A network interconnecting device according to claim 4 further comprising:

means for determining PortLoad information representative of data flow through at least one of said interconnecting channels attributable to at least one connected downstream network port as a function of the information characteristic of the data flow through said downstream network port and information characteristic of the data flow through at least one connected upstream network port.

6. A network interconnecting device according to claim 5 further comprising:

means for determining ChannelLoad information representative of data flow through a first interconnecting channel as a function of the information characteristic of data flow through each network port connected to said first interconnecting channel;

means for determining ChannelLoad information representative of data flow through a second interconnecting channel as a function of the information characteristic of data flow through each network port connected to said second interconnecting channel;

means for determining an average ChannelLoad as a function of the ChannelLoads of at least said first interconnecting channel and said second interconnecting channel; and means for changing the connection of a network port from said first interconnecting channel to said second interconnecting channel if the sum the PortLoad of said network port and the ChannelLoad of said second interconnecting channel is less than the average ChannelLoad.

7. A network interconnecting device according to claim 5 further comprising:

means for changing the connections of all network ports connected to an interconnecting channel having a failed or inactive upstream port to one or more interconnecting channels associated with the same LLAN and having at least one active upstream port.

8. A method of selectively interconnecting a plurality of network ports to a plurality of interconnecting repeater channels of a port switching hub, said method comprising the steps of:

A) monitoring information characteristic of data flow through at least two of said network ports;

B) generating information representative of data flow through each of said network ports as a function of said information characteristic of data flow through each of said network ports;

C) selectively connecting at least one of said network ports to one of said interconnecting repeater channels as a function of said information representative of the data flow through each of said network ports.

9. A method according to claim 8, further comprising the step of designating one or more of said interconnecting channels as being associated with a logical LAN (LLAN), and wherein said network ports are only connected to interconnecting repeater channels associated with the same LLAN.

10. A method according to claim 8, further comprising the step of designating at least one network port as an upstream network port and designating at least one network port as a downstream network port.

11. A method according to claim 10, further comprising the step of determining characteristic information about the data flow through at least one of said interconnecting channels that is attributable to at least one connected downstream network port as a function of information characteristic of the data flow through said connected downstream network port and information characteristic of the data flow through at least one connected upstream network port.

12. A method according to claim 11, further comprising the step of selectively connecting at least one downstream network port to an interconnecting channel as a function of said determined characteristic information about the data flow through at least one interconnecting channel that is attributable to said downstream network port.

13. A method according to claim 10, further comprising the step of changing the connections of all downstream network ports connected to an interconnecting channel having at least one failed or inactive upstream network port to one or more interconnecting channels of the same LLAN having at least one active upstream port.

14. A method of adjusting network data flow through a port switching hub, said hub including a plurality of network ports and a plurality of interconnecting repeater channels for operatively interconnecting at least two of said network ports to permit network data units to be transferred between network devices operatively coupled to said network ports, said hub further including port switching means for selectively coupling each of said network ports to one of said repeater channels and traffic monitoring means for monitoring information characteristic of data flow through each port, said method comprising the steps of:

A) designating at least two of said repeater channels as being associated with a logical LAN (LLAN), wherein each of said network devices connect to each of the network ports connected to the repeater channels of a LLAN are connection equivalent network devices;

B) for said at least one LLAN:
1) designating each network port operatively coupled to a network device that utilizes network resources as a downstream port and designating each network port operatively coupled to a network device that provides access to a network resource as an upstream port;
2) for each network port of said LLAN, determining a PortLoad as a function of a quantity of network data units transferred through each network port over a predefined period of time;
3) for each repeater channel of said LLAN, determining a ChannelLoad as a sum of the PortLoads for all network ports operatively coupled to said repeater channel and determining a ServerLoad as a sum of the PortLoads of the upstream network ports operatively coupled to said repeater channel;
4) for each downstream network port of said LLAN, determining a portion of the ServerLoad attributable to said network port and adjusting the PortLoad of said network port by said portion;
5) determining an Average ChannelLoad as the sum of the ChannelLoads for all the repeater channels associated with said LLAN divided by the total number of repeater channels associated with said LLAN;
6) determining a first repeater channel, $C_G$ having a ChannelLoad which is greater than the Average ChannelLoad, a second repeater channel, $C_S$ having a ChannelLoad which is less than the Average ChannelLoad, and selecting a port, $P_G$, having a determined PortLoad, coupled to said first repeater channel $C_G$;
7) switching said port $P_G$ to be coupled to said second repeater channel $C_S$, if the sum of the PortLoad of the port $P_G$ and the ChannelLoad of the second repeater channel $C_S$ is less than the Average ChannelLoad.

15. A method according to claim 14 further comprising the step of:
8) repeating steps 3), 4), 6) and 7), at least once.

16. A method according to claim 14 further comprising the step of:
8) repeating steps 3), 4), 6) and 7), for each network port connected to a repeater channel having a ChannelLoad above the Average ChannelLoad.

17. A method according to claim 16 further comprising the steps of:
9) for all channels having a ChannelLoad below the Average ChannelLoad, determining the average of the differences between the ChannelLoads of the channels and the Average ChannelLoad and increasing the Average ChannelLoad by said average; and
10) repeating steps 3), 4), 6) and 7), at least once.

* * * * *

Adverse Decision In Interference

Patent No. 5,742,587, John G. Zornig, Tavit K. Ohanian, George A. Klarakis, LOAD BALANCING PORT SWITCHING HUB, Interference No. 104,680, final judgment adverse to the patentees rendered June 1, 2001, as to claims 1-17.

*(Official Gazette July 10, 2001)*